United States Patent
Hanano

(10) Patent No.: US 9,015,732 B2
(45) Date of Patent: Apr. 21, 2015

(54) INFORMATION PROCESSING APPARATUS AND CONTROL METHOD THEREOF

(75) Inventor: Hideki Hanano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 475 days.

(21) Appl. No.: 13/093,580

(22) Filed: Apr. 25, 2011

(65) Prior Publication Data

US 2011/0265100 A1     Oct. 27, 2011

(30) Foreign Application Priority Data

Apr. 27, 2010   (JP) .................... 2010-102524

(51) Int. Cl.
*G06F 9/44*   (2006.01)
*G06F 9/54*   (2006.01)
*G06F 9/445*  (2006.01)
*H04L 29/08*  (2006.01)

(52) U.S. Cl.
CPC .............. *G06F 9/542* (2013.01); *G06F 9/4411* (2013.01); *G06F 9/445* (2013.01)

(58) Field of Classification Search
None
See application file for complete search history.

(56) References Cited

U.S. PATENT DOCUMENTS

| 7,173,723 | B1 * | 2/2007 | Ando | 358/1.15 |
| 2003/0101289 | A1 * | 5/2003 | Alikberov et al. | 709/321 |
| 2005/0108729 | A1 * | 5/2005 | Camara et al. | 719/321 |

FOREIGN PATENT DOCUMENTS

JP    11-355481 A    12/1999

\* cited by examiner

*Primary Examiner* — Andy Ho
*Assistant Examiner* — Abdou Seye
(74) *Attorney, Agent, or Firm* — Canon USA, Inc. IP Division

(57) ABSTRACT

An information processing apparatus capable of performing exclusive control on a communication channel for communicating with a peripheral apparatus among a device driver for the peripheral apparatus and a plurality of communication programs identifies, if the device driver is instructed to start up, which of the plurality of communication programs is using the communication channel by acquiring process information that is managed by an operating system (OS), issues a request to the identified communication program to close the communication channel, and enables the device driver to use the communication channel.

15 Claims, 6 Drawing Sheets

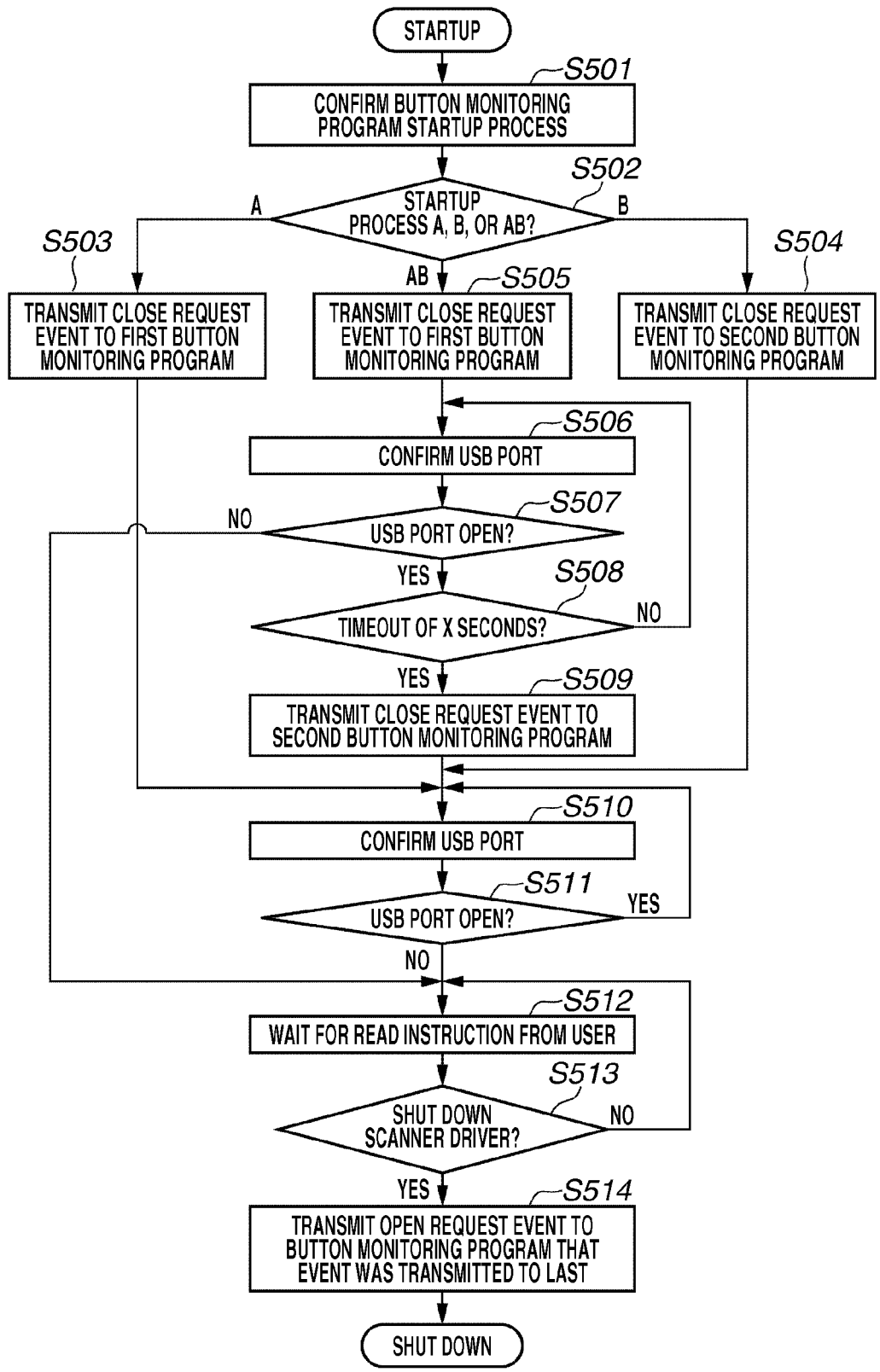

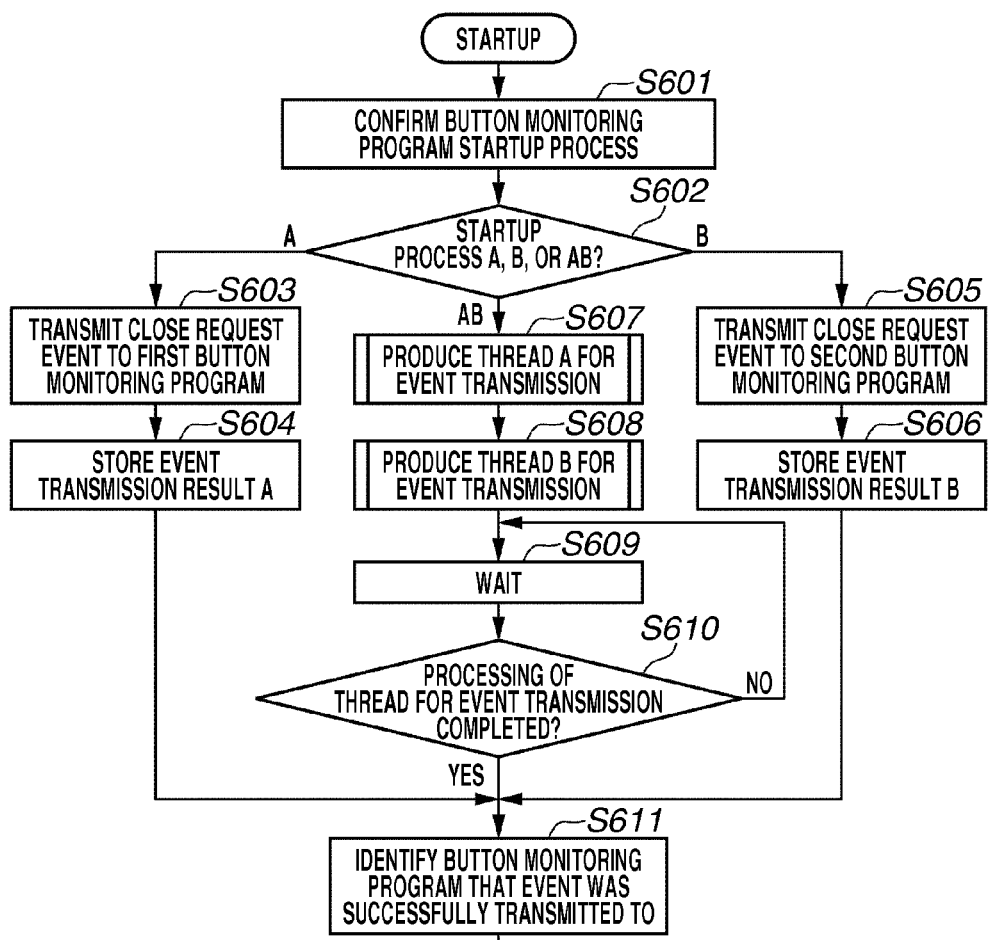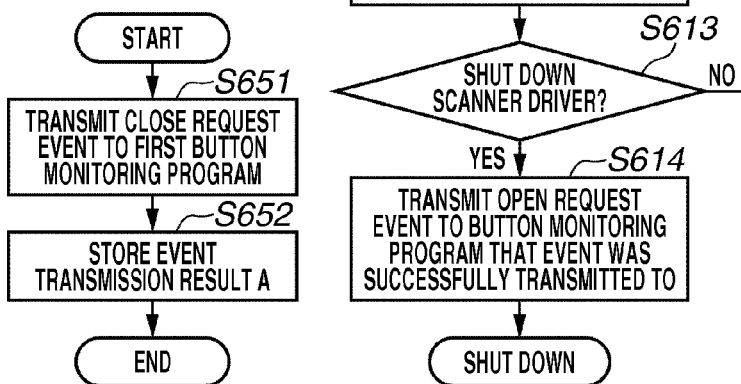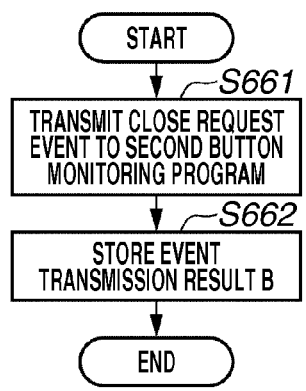

INFORMATION PROCESSING APPARATUS AND CONTROL METHOD THEREOF

BACKGROUND OF THE INVENTION

1. Field of the Invention

The present invention relates to an information processing apparatus for controlling a peripheral apparatus, and a control method thereof.

2. Description of the Related Art

Conventionally, an image reading apparatus (e.g., a dedicated scanner and a multifunction peripheral that includes a printer etc.) is one example of a peripheral apparatus. An image reading apparatus acting as such a peripheral apparatus reads an image based on an instruction from a scanner driver that is installed in an information processing apparatus, such as a computer. Further, for such an image reading apparatus, a technique is known in which an operation unit provided in the image reading apparatus issues a read instruction to start image reading, and the read image is transferred to the information processing apparatus (see Japanese Patent Application Laid-Open No. 11-355481).

In order to enable the information processing apparatus to detect the fact that a user has issued a read instruction from the operation unit of the image reading apparatus, a button monitoring program can be used to monitor a button event of an image input apparatus, such as the scanner, in the information processing apparatus. If the button monitoring program detects an event indicating that the button for instructing the image reading apparatus to start reading was operated, image reading is executed in the following manner, and the information processing apparatus acquires the image data obtained by reading the image.

If the button monitoring program detects an event, first, a predetermined application is called up. The application is registered as an application to be started when the button is pressed. Then, the application calls up a scanner driver (e.g. a "tool without an interesting name" (TWAIN) driver) based on the TWAIN standard to cause the image reading apparatus to read an image. Next, the application acquires the image data obtained by the reading performed by the TWAIN driver.

In this case, communication to detect an event and communication of image data are performed between the image reading apparatus and the information processing apparatus. However, depending on the operating system (OS) of the information processing apparatus, the system may lack a mechanism for simultaneously securing a communication channel for the button monitoring program and for the scanner driver. Consequently, it is necessary to perform exclusive control of the communication channel between the button monitoring program and the scanner driver.

More specifically, before the scanner driver is to acquire the image data, the OS closes the communication channel used by the button monitoring program, and then opens the communication channel for the scanner driver. During this process, the OS refers to information (device information), which is recorded in a predetermined location, specifying the image reading apparatus associated with the button monitoring program, and device information associated with the scanner driver. If these pieces of the information match, the OS then performs the above exclusive control. In addition to the above-described startup method, in which the scanner driver is started via the button monitoring program, the user can also directly operate the scanner driver to execute image reading in the image reading apparatus.

In some cases, for example, a scanner driver may be newly installed into an information processing apparatus in which a scanner driver and a button monitoring program are already present, and the image reading executed in the image reading apparatus by starting this new scanner driver. If image reading is executed in the image reading apparatus by starting this new scanner driver, the communication channel used by the already-running button monitoring program needs to be closed.

However, if the OS cannot specify the device information, for example if the new scanner driver is not based on a predetermined application programming interface (API) standard such as TWAIN, the OS cannot perform the above exclusive control. More specifically, even if the new scanner driver is started, if the device information is not recorded in a predetermined location, the OS cannot close the communication channel used by the already-running button monitoring program. Therefore, the scanner driver that is started according to a procedure not based on the predetermined API cannot execute reading processing.

Further, there may be a plurality of button monitoring programs present in one information processing apparatus. In such a case, when the scanner driver is started, the scanner driver needs to specify the button monitoring program opening the communication channel, and issue a close request thereto.

However, even if the scanner driver could specify the button monitoring program and issue a close request, if a button monitoring program other than the specified button monitoring program is running, the scanner driver cannot causes the button monitoring program to close.

Such an issue not only occurs in image reading apparatuses, but in other peripheral apparatuses as well. Specifically, the same issue can occur in a situation which requires exclusive control of the communication channel used among a plurality of programs when there is no mechanism for closing a communication channel that is being used by another program based on the startup of the device driver.

SUMMARY OF THE INVENTION

The present invention is directed to an information processing apparatus that resolves the above issue, and a control method thereof. Further, the present invention is directed to a mechanism for suitably closing a communication channel being used by another program even when the channel cannot be closed just by starting up a device driver.

According to the present invention, an information processing apparatus capable of performing exclusive control on a communication channel for communicating with a peripheral apparatus among a plurality of programs includes a device driver for the peripheral apparatus, configured to communicate with the peripheral apparatus via the communication channel, a plurality of communication programs configured to communicate with the peripheral apparatus via the communication channel, an identification unit configured to, if the device driver is instructed to start up, identify which of the plurality of communication programs is using the communication channel by acquiring process information that is managed by an operating system (OS), and a control unit configured to issue a request to the communication program identified by the identification unit to close the communication channel and enable the device driver to use the communication channel.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 is a flowchart illustrating processing for identifying a close target button monitoring program according to the exemplary embodiment.

FIGS. 6A to 6C are flowcharts illustrating processing for identifying a close target button monitoring program according to the exemplary embodiment.

DESCRIPTION OF THE EMBODIMENTS

Various exemplary embodiments, features, and aspects of the invention will be described in detail below with reference to the drawings.

Not all of the constituent elements of the apparatus used in the exemplary embodiments are essential to the present invention. Further, various modifications and applications of these constituent elements are possible. More specifically, the present invention is not limited to the specific configuration described in the following exemplary embodiments.

Figure 1:
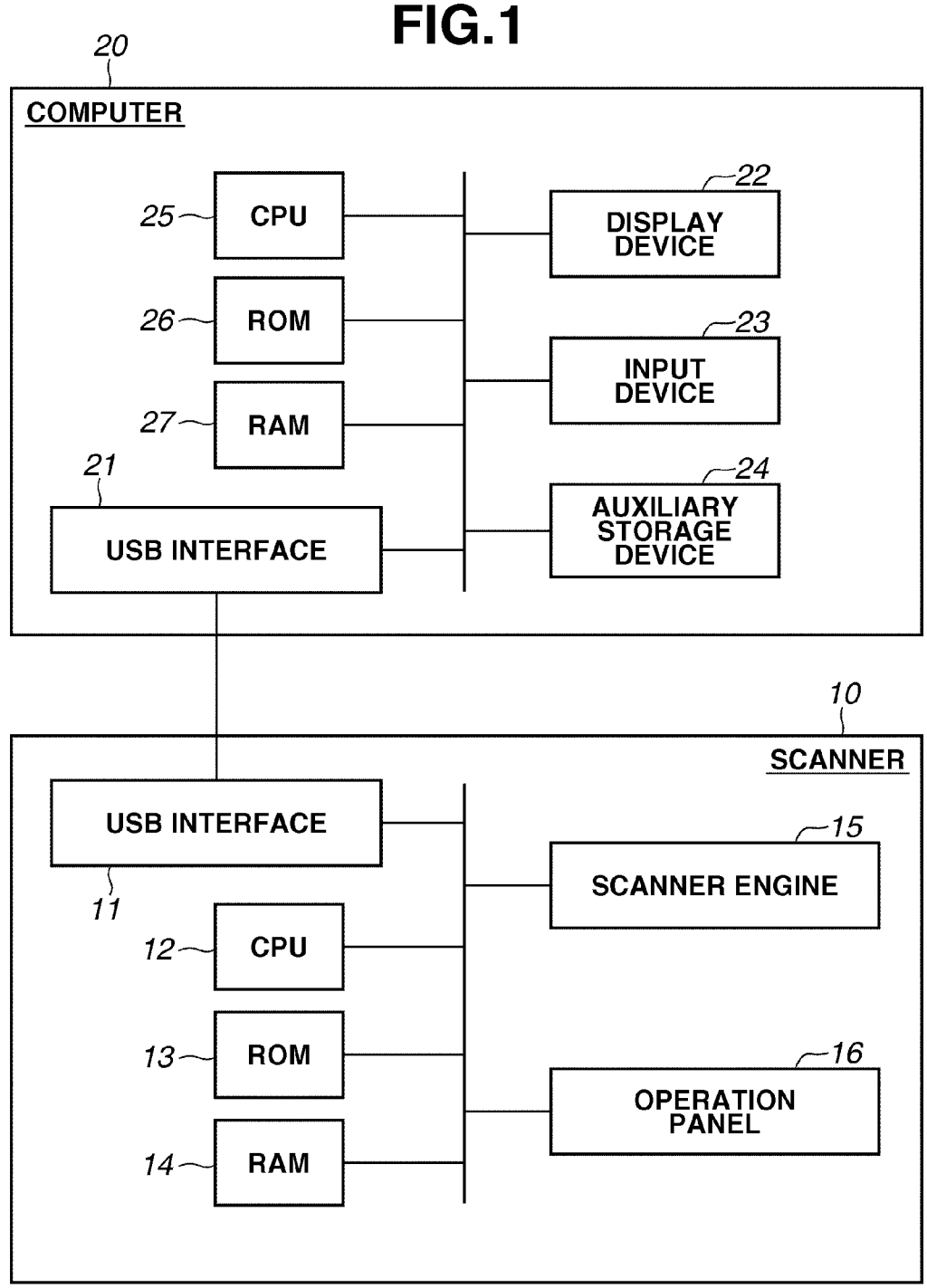
FIG. 1 is a block diagram illustrating an image reading system according to an exemplary embodiment of the present invention.

FIG. 1 is a block diagram illustrating the configuration of an image reading system that includes a computer 20, which is an example of the information processing apparatus, and a scanner 10, which is an example of a peripheral apparatus, according to a first exemplary embodiment of the present invention.

The scanner 10 includes, as hardware resources, a universal serial bus (USB) interface 11, a central processing unit (CPU) 12, a read-only memory (ROM) 13, a random access memory (RAM) 14, a scanner engine 15, and an operation panel 16. The USB interface 11 transmits and receives data to and from the computer 20 based on a USB standard. The CPU 12 loads into the RAM 14 a control program for the scanner 10 that is stored in the ROM 13, and controls the operation of the scanner 10 by executing the control program. In addition to the control program, the ROM 13 stores the parameters that are required for an operation of the scanner 10. The RAM 14 is used as a work area of the CPU 12, and also as a temporary storage area for state information about the scanner 10 and image data.

The scanner engine 15 includes a light source which irradiates light onto a document, and a charge-coupled device (CCD) color image sensor for reading reflected light from the document and photoelectrically converting the read light. The scanner engine 15 reads an image of the document by scanning the document, which is placed on a platen of the scanner 10, and creates image data (read image data) based on the read image. The operation panel 16 includes a display unit that displays a state of the scanner 10 and a menu that allows the user to perform operations, and hard keys that allow the user to perform various operations including the instruction to start reading. The operation panel 16 may have some other configuration, such as a touch panel.

Further, although the scanner 10 is used here as an example of a dedicated scanner, the scanner 10 may be configured as a multifunctional device that also includes other additional functions, such as a printer. In addition, when reading the document image, although the document is placed on the platen and then scanned, a document conveyance mechanism may be provided, so that scanning is performed by fixing the scanner engine 15 and conveying the document. Moreover, as the operation for starting the reading by the scanner 10, instead of using the operation panel 16, the computer 20 may be notified that the reading target document is detected as having been set in the scanner 10. Still further, the scanner 10 may be configured without the CPU 12, so that the scanner engine 15 can be operated based on a control from the computer 20. In addition, instead of a color scanner, a monochrome scanner or a film scanner that reads film may be employed.

The computer 20 includes, as hardware resources, a USB interface 21, a display device 22, an input device 23, an auxiliary storage device 24, a CPU 25, a ROM 26, and a RAM 27. As the computer 20, a versatile personal computer may be employed. The USB interface 21 transmits and receives data to and from a peripheral apparatus based on a USB standard. The display device 22 displays various pieces of information, such as various user interfaces (UI) for operating the scanner 10 based on software installed in the computer 20. The input device 23 is realized by a keyboard, a pointing device and the like, and is for inputting information indicating an operation from the user.

The auxiliary storage device 24 is realized by an internal or an external hard disk, for example, and stores various pieces of information relating to an operation of the scanner 10, such as the scanner 10 control program. The CPU 25 loads into the RAM 27 various programs stored in the auxiliary storage device 24 and the ROM 26, and controls the operations of the computer 20 by executing those programs. The ROM 26 stores various programs and various pieces of information for operating the computer 20. The RAM 27 is used as a work area for the CPU 25, and also stores various pieces of information.

Figure 2:
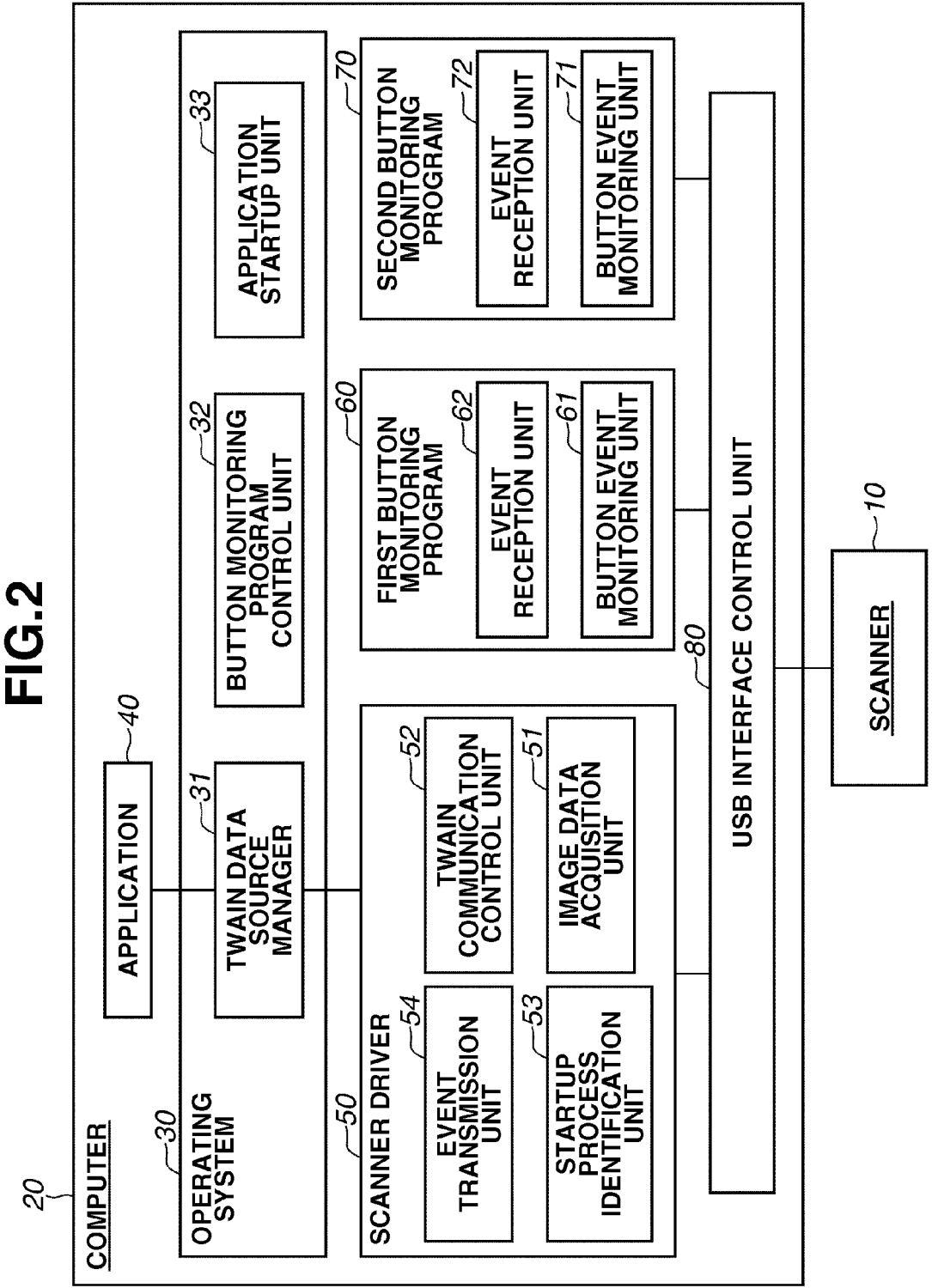
FIG. 2 is a block diagram illustrating a computer software configuration according to the exemplary embodiment.

Next, using FIG. 2, the configuration of the functions that are realized by the software in the computer 20 illustrated in FIG. 1 will be described. The functions illustrated in FIG. 2 are realized by, for example, the CPU 25 reading and executing the programs stored (installed) in the ROM 26 and the auxiliary storage device 24 while using the RAM 27 as a work area.

The functions of the computer 20 may be broadly broken into an OS 30, an application 40, a scanner driver 50, a first button monitoring program 60, a second button monitoring program 70, and a USB interface control unit 80.

The OS 30 includes functions such as control of the basic parts for operation of the computer 20, control of output to the display device 22 and input from the input device 23, and management of the various memories, such as the auxiliary storage device 24. Further, the OS 30 includes a TWAIN data source manager (TWAIN DSM) 31, a button monitoring program control unit 32, and an application startup unit 33.

The TWAIN DSM 31 controls the application 40 and the scanner driver 50. The TWAIN DSM 31 is an API that realizes communication between the application 40 and the scanner driver 50 based on a TWAIN standard. If an instruction is issued to startup the scanner driver 50 by a command based on the TWAIN standard, the TWAIN DSM 31 issues a close request to the button monitoring program 60. When a monitoring program for monitoring whether a peripheral apparatus such as the scanner 10 is operated is present in the computer 20, the button monitoring program control unit 32 starts up and shuts down the monitoring program. The application startup unit 33 can be realized by an API that provides a function for starting the specified application.

The application 40 is a software program for processing input image data. The application 40 can acquire image data from a data source (scanner driver) based on the TWAIN standard by issuing an instruction to the data source via the TWAIN DSM 31. The application 40 can also edit or correct the acquired image data, display the resultant data on the display device 22, and store the data as an image file in the auxiliary storage device 24. Further examples of the application 40 may include character recognition software, which recognizes character information included in input image data, and converts the recognized character information into a character code.

The scanner driver 50 performs transmission control of a command for controlling the scanner 10 and reception control of image data from the scanner 10. The transmission of a command and the reception of image data by the scanner driver 50 are performed via the USB interface control unit 80. The scanner driver 50 has a TWAIN mode, in which operations based on the TWAIN standard are performed, and a non-TWAIN mode, in which operations not based on the TWAIN standard (e.g., production of read image data from RAW data) can also be performed.

Although the scanner driver 50 is associated with device information for specifying the image reading apparatus, in the present exemplary embodiment, the scanner driver 50 is associated with the device information indicating the scanner 10. The device information indicating the scanner 10 is recorded in a predetermined file associated with the scanner driver 50. However, although the device information is recorded in the file when the scanner driver 50 operates in the TWAIN mode and functions as the TWAIN driver, the device information is not recorded in the file when the scanner driver 50 operates in the non-TWAIN mode.

Therefore, when the scanner driver 50 operates in the TWAIN mode, exclusive control of the USB port is performed by the TWAIN DSM 31 of the OS 30, and when the scanner driver 50 operates in the non-TWAIN mode, the exclusive control is not performed. Further, the scanner driver 50 includes an image data acquisition unit 51, a TWAIN communication control unit 52, a startup process identification unit 53, and an event transmission unit 54.

The image data acquisition unit 51 acquires the image data read by the scanner 10 via the USB interface control unit 80. The image data acquired by the image data acquisition unit 51 is stored in the RAM 27, and then transferred to the application 40 based on control by the TWAIN communication control unit 52.

The TWAIN communication control unit 52 exchanges command groups based on the TWAIN standard between the application 40 and the scanner driver 50. The TWAIN communication control unit 52 receives reading settings, such as a reading resolution, a color mode, and a document size, from the application 40 and sets the received reading settings in the scanner driver 50. Further, in response to an image transfer request from the application 40, the TWAIN communication control unit 52 controls so that the image data read by the scanner 10 is transferred to the application 40. The transfer of the reading setting information and the image data is performed via the TWAIN DSM 31.

The startup process identification unit 53 identifies the information specifying the various programs currently operating (running) on the OS 30 by referring to the process information managed by the OS 30. The startup process identification unit 53 can identify which of the programs included in the process information may be opening a USB port for communicating with the scanner 10.

The event transmission unit 54 transmits predefined event information to a predetermined application by utilizing inter-process communication (communication among the currently operating programs).

In addition to startup based on an instruction from a TWAIN-compatible application, the scanner driver 50 can also start up based on a direct operation from the user. Further, even when a read instruction is made by the user, the scanner driver 50 can issue a read instruction. The expression "direct operation from the user" refers to a case in which the user starts the scanner driver 50 using the input device 23, so that a UI screen possessed by the scanner driver 50 is displayed on the display device 22, and the user makes a read instruction via that screen. When the direct operation is performed, the scanner driver 50 can be operated in the non-TWAIN mode.

The first button monitoring program 60 and the second button monitoring program 70 (hereinafter, simply referred to as button monitoring program 60 or 70) transmit a command for controlling the scanner 10 and receive data indicating the state of the scanner 10. The transmission of a command and reception of data indicating a state is performed via the USB interface control unit 80. Further, although the button monitoring programs 60 and 70 are associated with the device information for specifying the peripheral apparatus, in the present exemplary embodiment, the button monitoring programs 60 and 70 will be associated with the device information indicating the scanner 10. The device information indicating the scanner 10 is recorded in predetermined files respectively associated with the button monitoring programs 60 and 70.

The state of the scanner 10 at this stage is not limited to whether a "button" is pressed or not. The state may be in any form, as long as the fact that some kind of operation is performed by the user can be acquired. Further, in the present exemplary embodiment, a plurality of button monitoring programs 60 may simultaneously be present in the computer 20 (the auxiliary storage device 24). However, the OS 30 in the present exemplary embodiment starts up only one of the button monitoring programs as a button monitoring program for monitoring the state of the scanner 10 connected via the USB interface 21. The present exemplary embodiment will be described below with only an arbitrary one of the button monitoring programs 60 and 70 started.

The button monitoring program 60 includes a button event monitoring unit 61 and an event reception unit 62. The button monitoring program 70 also includes a button event monitoring unit 71 and an event reception unit 72. Since the respective units have the same functions as the button event monitoring unit 61 and the event reception unit 62, a description thereof will be omitted.

The button event monitoring unit 61 periodically monitors whether a button event has occurred due to a user operation on the operation panel 16 of the scanner 10. Although the operation performed on a monitoring target by the user will be described as the pressing of a "button" as an example, as described above, the operation is not limited to the pressing of the "button". Any operation may be employed, as long as the operation is performed by the user for the purpose of reading the document.

When a button event such as an instruction from the operation panel 16 to start reading is detected, the button event monitoring unit 61 instructs a predetermined application to start up via the application startup unit 33 of the OS 30. For example, the image data in a desired format can be acquired from the scanner driver 50 in conjunction with detection of the button event by transferring a prepared file relating to the reading setting of the scanner 10 to the started application.

The event reception unit 62 receives predefined event information based on inter-process communication from a predetermined application. When the button monitoring program 60 determines that the event information received by the event reception unit 62 indicates a close request, the button monitoring program 60 opens the USB port via the USB interface control unit 80.

Further, if the OS 30 detects that the scanner 10 is connected via the USB interface 21, the button monitoring programs 60 and 70 open a USB port according to a procedure based on a predetermined communication standard (plug & play). The term "USB port" refers to a logical channel for communication via the USB interface 21. By opening the USB port, a transfer pipe for exchanging information with the scanner 10 connected via the USB interface 21 is secured. Further, the USB port for communicating with the scanner 10 is used exclusively by one scanner driver or one button monitoring program.

When the connection with the scanner 10 is started, first, the button monitoring program uses the USB port for monitoring a button event from the scanner 10. If there is a plurality of button monitoring programs, one of these is selected and started up based on a predetermined condition. Further, if the connection via the USB interface 21 is disconnected, and if the scanner driver 50 is started, the button monitoring programs 60 and 70 close the USB port according to a procedure based on the predetermined communication standard.

Figure 3:
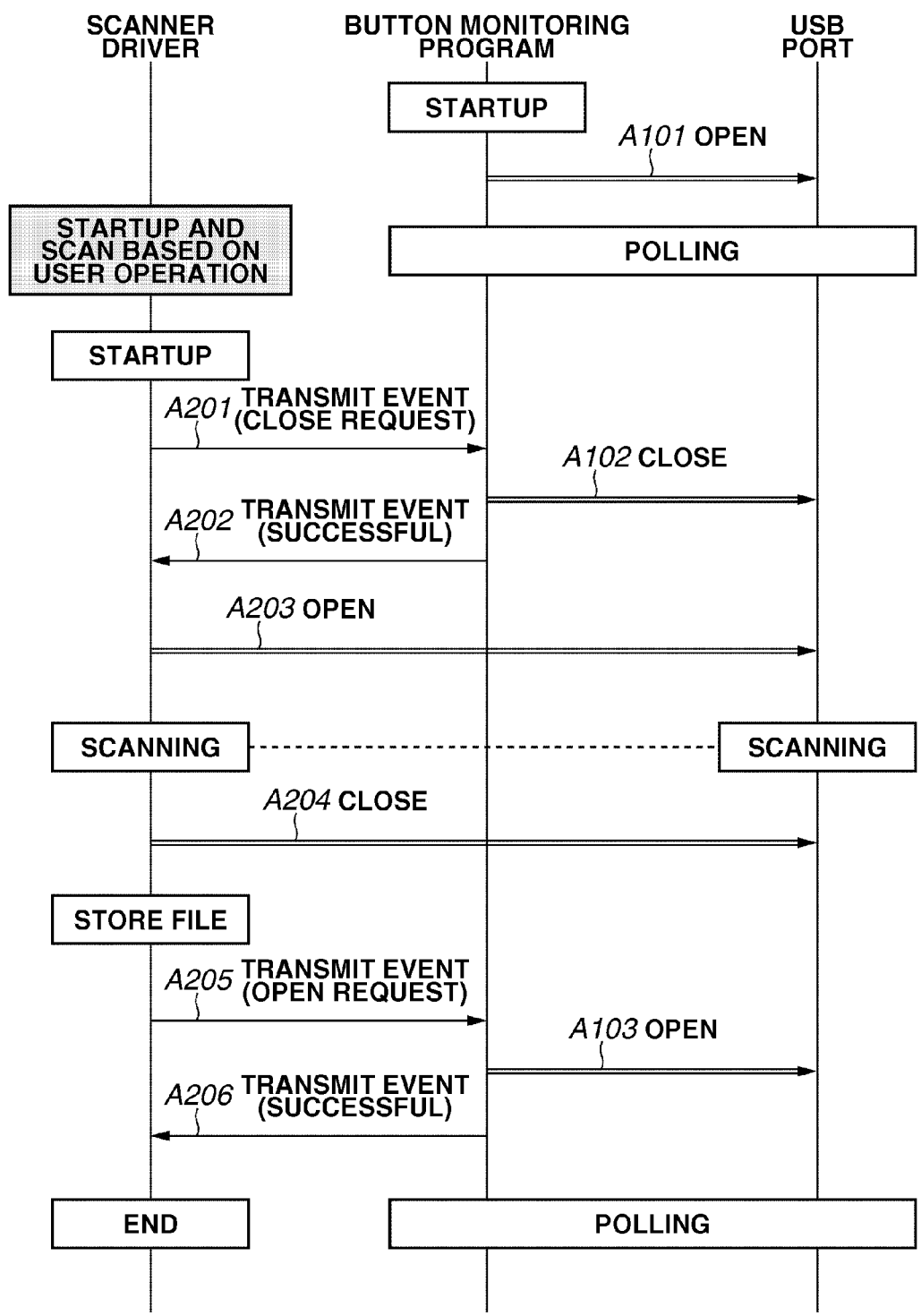
FIG. 3 illustrates a sequence of reading processing using a scanner driver according to the exemplary embodiment.

Next, the processing flow when the scanner 10 performs reading processing with the scanner driver 50 operated in the non-TWAIN mode will be described. Here, the scanner driver 50 causes the scanner 10 to execute reading processing without using a command based on the TWAIN-standard. FIG. 3 illustrates a sequence flow of the processing performed by the computer 20 in this case. The following sequence illustrates a processing flow performed by the CPU 25 of the computer 20 loading programs stored in the ROM 26 and the auxiliary storage device 24 into the RAM 27, and executing those programs.

First, when the scanner 10 is connected via the USB interface 21, one button monitoring program (in this example, the button monitoring program 60) is started by the OS 30. Next, in step A101, the button monitoring program 60 opens a USB port which is a logical channel for communication with the scanner 10 and repeatedly performs polling to monitor the occurrence of a button event in the scanner 10.

Once the scanner driver 50 is started based on an instruction from the user, a UI screen provided by the scanner driver 50 to allow the user to issue a read instruction is displayed on the display device 22. When the user issues a read instruction via the UI screen, the scanner driver 50 is operated in the non-TWAIN mode. Thus, during the period that the button monitoring program 60 secures the USB port, the scanner driver 50 is operated in the non-TWAIN mode. More specifically, the scanner driver 50 issues a startup instruction based on a request that is not based on the TWAIN standard.

Since the scanner driver 50 is not started as the TWAIN driver, exclusive control of the USB port by the OS 30 (TWAIN DSM 31) is not performed just based on the starting up of the scanner driver 50. This is because when the scanner driver 50 is operated in the non-TWAIN mode, the device information is not recorded in the predetermined file that enables exclusive control by the OS 30.

Therefore, in step A201, the scanner driver 50 identifies the communication program (button monitoring program) that is currently opening the USB port. Then, the event transmission unit 54 transmits an event indicating the close request to the button monitoring program by inter-process communication. The procedure for identifying the button monitoring program that is currently opening the USB port will be described below.

In step A102, when the event reception unit 62 of the button monitoring program 60 receives the event indicating the close request transmitted in step A201, the event reception unit 62 closes the already open USB port that it is itself using. Then, in step A202, the button monitoring program 60 transmits information indicating a successful close to the scanner driver 50 as a response to the close request transmitted in step A201.

In step A203, once the scanner driver 50 confirms that the USB port was successfully closed, since it has become possible for the scanner driver 50 to itself use the USB port, the scanner driver 50 opens the USB port so that it can perform reading processing. Then, the scanner driver 50 causes the scanner 10 to execute reading processing based on the reading settings specified on the UI screen of the scanner driver 50, acquires the read image data. When acquisition of the read image data from the scanner 10 is finished, then in step A204, the scanner driver 50 closes the USB port.

Based on a specification by the user, the scanner driver 50 performs processing such as storing the image data in the auxiliary storage device 24 as an image file. The processing for producing and storing the image file may also be performed before closing the USB port. Further, the image data processing is not limited to file storage. Other types of processing may also be performed. In addition, the processing contents may be subjected to pre-specified processing, or may be subjected to processing that is specified based on an instruction from the user after the read image data is received.

When the reading processing (in this example, acquisition of the read image data and file storage) is finished, in step A205, the scanner driver 50 transmits an open request event to the button monitoring program 60. In step A103, the button monitoring program 60 receives the event, and opens the USB port. Then, in step A206, once the USB port is successfully opened by the button monitoring program 60, the button monitoring program 60 transmits information indicating that the USB port was successfully opened as a response to the transmission of the open request event. Once the button monitoring program 60 has opened and is in possession of the USB port, the button monitoring program 60 restarts the polling for monitoring events in the scanner 10, and performs the same processing as the above-described processing that is performed at startup.

Figure 4:
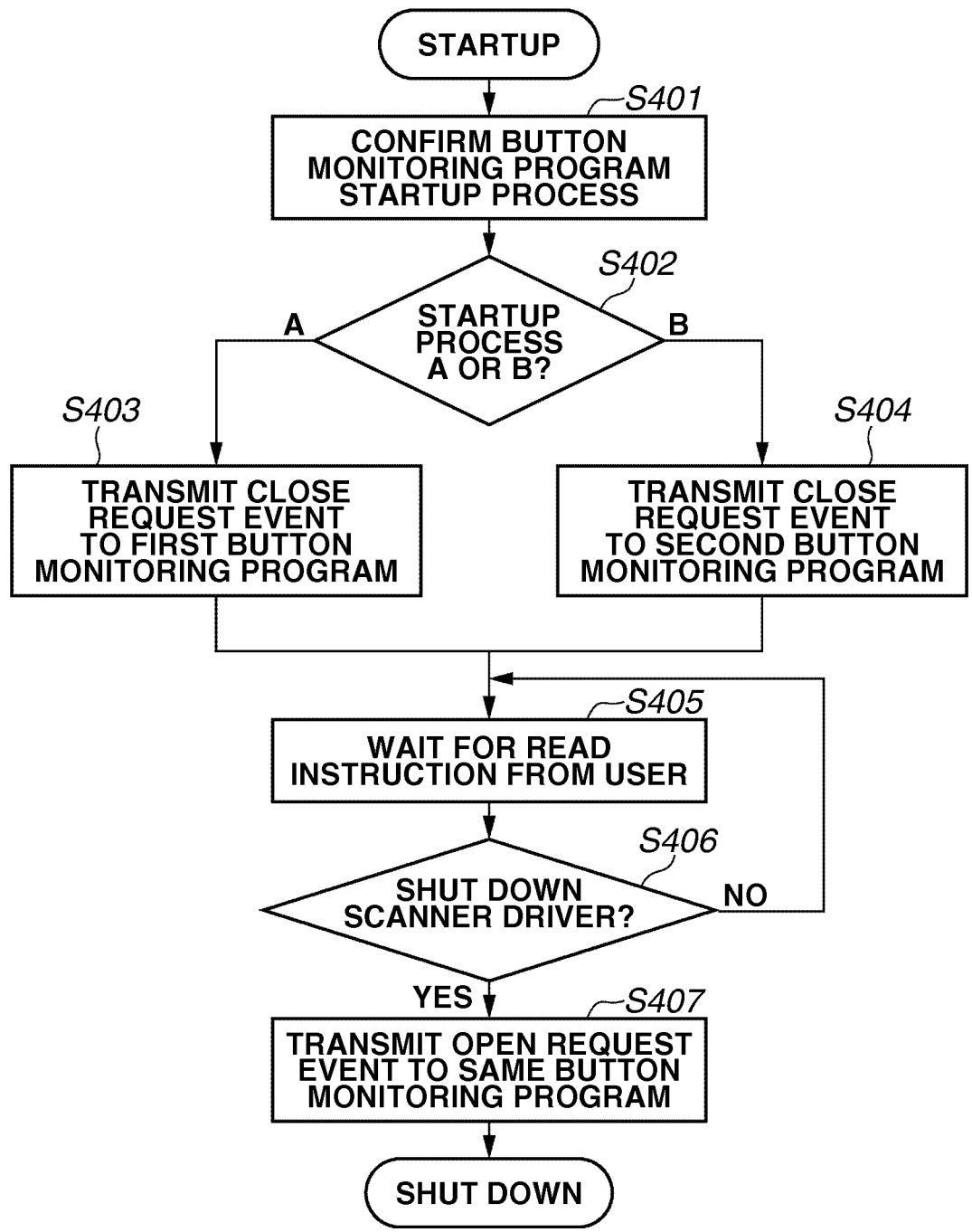
FIG. 4 is a flowchart illustrating processing for identifying a close target button monitoring program according to the exemplary embodiment.

The processing for identifying the program of the event transmission destination performed by the scanner driver 50 in step A201 in the above sequence will now be described in more detail. FIG. 4 is a flowchart illustrating a flow according to the first exemplary embodiment of the processing performed in this case. The flowchart illustrates a processing flow performed by the CPU 25 of the computer 20 loading programs stored in the ROM 26 and the auxiliary storage device 24 into the RAM 27, and executing those programs.

When the scanner driver 50 is started in the non-TWAIN mode and a read instruction is made by the user, in step S401, the CPU 25 confirms the button monitoring program (startup process) that is currently running from among the process information managed by the OS 30. The confirmation is performed by identifying, via the API provided by the OS 30, the ID of the program that is opening the USB port from among the plurality of programs currently running. If it is known in advance that the only communication program that could be opening the USB port to communicate with the scanner 10 is either the button monitoring program 60 or 70, then the confirmation can simply be performed by identifying which of these programs is running.

In step S402, the CPU 25 determines whether the program opening the USB port is a type A or a type B. In this example, the program is either the button monitoring program 60 or 70, which corresponds to the program being either type A or type B. In the following description, the type A will refer to button monitoring program 60, and the type B will refer to the button monitoring program 70.

If it is determined that the started program is the button monitoring program 60 ("A" in step S402), then in step S403, the CPU 25 transmits a close request event specifying the button monitoring program 60 as the transmission destination of the event in step A201 in FIG. 3. If it is determined that the started program is the button monitoring program 70 ("B" in step S402), then in step S404, the CPU 25 transmits a close request event specifying the button monitoring program 70 as the transmission destination of the event in step A201 in FIG. 3.

Then, the processing illustrated in step A102 and subsequent steps of FIG. 3 is performed. In step A405, the CPU 25 waits for a read instruction from the user via the UI screen the scanner driver 50 displayed on the display device 22. When a read instruction is made, the scanner 10 read the image and acquires the read image data. However, a description of reading and acquiring the image data will be omitted here.

In step S406, the CPU 25 determines whether to shut down the scanner driver 50 based on whether the user performed processing to shut down the scanner driver 50 or the predetermined reading processing is finished. If it is determined that the scanner driver 50 to be shut down (YES in step S406), first, the USB port opened by the scanner driver 50 is closed. Then, in step S407, the CPU 25 transmits an open request event (step A205 in FIG. 3) to the button monitoring program to which the close request was made in step S403, and the CPU 25 shuts down the scanner driver 50.

Thus, even if there is a plurality of button monitoring programs in the computer 20, the present exemplary embodiment can identify the currently running program and cause the identified program to close the USB port. Further, even for an environment in which there are three or more programs using the USB port, the present exemplary embodiment can individually identify each of these programs, and instruct the identified programs to close the USB ports.

Next, a second exemplary embodiment of the processing for identifying the program of the event transmission destination that is performed by the scanner driver 50 in step A201 will be described. In the second exemplary embodiment, a case will be described in which the computer 20 includes a plurality of USB interfaces 21, and a different scanner can be connected to each of these USB interfaces. When a plurality of scanners is connected, a plurality of button monitoring programs is simultaneously started. FIG. 5 is a flowchart illustrating the processing performed in this case. The flowchart illustrates a processing flow performed by the CPU 25 of the computer 20 loading programs stored in the ROM 26 and the auxiliary storage device 24 into the RAM 27, and executing those programs.

In step S501, similar to step S401, the CPU 25 confirms the programs that are opening the USB ports. In this step, although the CPU 25 can confirm that the button monitoring program is running, it cannot confirm which program is opening the USB port corresponding to a predetermined one of the plurality of USB interfaces.

In step S502, in addition to the confirmation results described for step S402 (type A or type B), there is also a possibly that a program opening the USB port is both types A and B. If the confirmation result in step S502 is the type A or the type B, in steps S503 and 504, the same processing as in steps S403 and S403 is performed respectively. If the confirmation result in step S502 is the types A and B, the processing proceeds to step S505. In step S505, first, the CPU 25 transmits a close request event to the button monitoring program 60 as the transmission destination.

Then, in step S506, the scanner driver 50 confirms the state of the USB port corresponding to the USB interface connecting the scanner which it itself is using. Based on the confirmation result, instep S507, if it is determined that the USB port is left open (YES in step S507), then in step S508, the CPU 25 determines whether X seconds (X is a predetermined duration) have elapsed since the event transmission in step S505. If it is determined that X seconds have not elapsed (NO in step S508), the processing in steps S506 and onwards is repeated.

If the USB port is still open even though X seconds have elapsed (YES instep S508), it is determined as a time out, so the button monitoring program of the event transmission destination determines that the USB port that the scanner driver 50 intended to use is not open. Then, in step S509, the CPU 25 transmits a close request event to the second button monitoring program 70 as the transmission destination.

In step S510, similar to step S506, the CPU 25 confirms the state of the USB port. In step S511, if it is confirmed that the USB port is closed (NO in step S511), the processing proceeds to step S512. Further, if it was confirmed in the above step S507 that the USB port is closed (NO in step S507), the processing also proceeds to step S512.

The processing performed in step S512 is executed based on the processing of steps A102 and onwards in FIG. 3. In step S512, similar to step S405, the CPU 25 waits for a read instruction from the user. In step S513, similar to step S406, the CPU 25 determines whether to shut the scanner 50.

In step S514, similar to step S407, first, the scanner driver 50 closes the USB port that it itself had opened. Then, the scanner driver 50 transmits an open request to the button monitoring program that closed the USB port in response to the USB port close request made in steps S503, S504, S505, and S509.

If the close request is transmitted to the button monitoring program 60 in step S503, in step S514, an open request is transmitted to the button monitoring program 60. If the close request is transmitted to the button monitoring program 70 in step S504, in step S514, an open request is transmitted to the button monitoring program 70.

Based on the close request transmitted to the button monitoring program 60 in step S505, if it is determined in step S507 that the USB port is not open (NO in step S507), in step S514, an open request is transmitted to the button monitoring program 60. Based on the close request transmitted to the button monitoring program 70 in step S509, if the button monitoring program 70 closed the USB port, in step S514, an open request is transmitted to the button monitoring program 70. Accordingly, if the USB port is successfully opened by either of the button monitoring programs, the scanner driver 50 can be shut down.

Thus, based on the processing illustrated in FIG. 5, even for the environment in which the plurality of programs using the USB port can be started, the present exemplary embodiment can suitably instruct the program that is currently running to close the USB port. Further, in the present exemplary embodiment illustrated in FIG. 5, when the plurality of button monitoring programs are running, a close request is first transmitted to the button monitoring program 60. However, this order may be determined based on the priority of each program, so that various orders may be employed. Further, in the present exemplary embodiment illustrated in FIG. 5, there are two programs that can use the USB port. However, the same processing can be performed even if there are three or more of such programs, by adding a procedure for confirming the programs that are currently running.

Next, in the second exemplary embodiment illustrated in FIG. 5, an example will be described that uses a thread in the processing for transmitting an event to the button monitoring program. FIGS. 6A to 6C are flowcharts illustrating the processing performed in this case. The flowchart illustrates a processing flow performed by the CPU 25 of the computer 20 loading programs stored in the ROM 26 and the auxiliary storage device 24 into the RAM 27, and executing those programs. FIG. 6A illustrates the main processing, and FIGS. 6B and 6C illustrate processing performed based on a thread for event transmission.

In step S601, similar to step S501, the program that is opening the USB port is confirmed. Then, in step S602, the confirmation result of the currently running button monitoring program is determined.

In the confirmation result, if there is only one button monitoring program that is currently running, then in step S603 or step S605, similar to steps S503 and S504, a close request event is transmitted to the button monitoring program. Based on the event transmission performed in steps S604 and S606, whether the USB port is successfully closed is stored in the RAM 27 associated with the button monitoring program of the event transmission destination.

In the confirmation result in step S602, if it is determined that both the button monitoring programs 60 and 70 are currently running, then in steps S607 and S608, an event transmission thread is created. When the event transmission threads have been created, each thread is executed in parallel.

FIG. 6B illustrates the processing for transmitting an event to the button monitoring program 60, and FIG. 6C illustrates the processing for transmitting an event to the button monitoring program 70. In steps S651 and S661, a USB port close request event is transmitted to the respective button monitoring programs. In steps S652 and S662, based on the event transmission, whether the USB port is successfully closed or not is stored in the RAM 27 associated with the button monitoring program.

In step S609, the CPU 25 waits for a predetermined duration from the creation of the event transmission threads in steps S607 and S608. In step S610, the CPU 25 determines whether the processing performed using the event transmission threads is completed (whether a result is stored in the RAM 27), and waits until such processing is completed.

In step S611, based on the event transmission stored in the RAM 27, the CPU 25 identifies the button monitoring program that successfully closed the USB port. The identification result is stored in the RAM 27.

Then, the processing performed in step S612 is executed based on the processing of steps A102 and onwards in FIG. 3. In step S612, similar to step S512, the CPU 25 waits for a read instruction from the user. In step S613, similar to step S513, the CPU 25 determines whether to shut down the scanner driver 50.

In step S614, the USB port opened by the scanner driver 50 is closed. Then, based on the event transmission results stored in the RAM 27 in steps S604, S606, and S611, an open request event is transmitted to the button monitoring program that successfully closed the USB port. Then, if the USB port is successfully opened by the button monitoring program, the scanner driver 50 can be shut down.

Thus, based on the processing such as that illustrated in FIG. 6, identification of the program that is opening the USB port can be performed more efficiently than the processing illustrated in FIG. 5 by, for example, transmitting a plurality of events in parallel. Further, in the example illustrated in FIG. 6, there are two programs that can use a USB port. However, the same processing can be performed even if there are three or more of such programs, by adding a thread for event transmission processing.

In the above exemplary embodiments, the scanner driver 50 has the TWAIN mode and the non-TWAIN mode. However, operation can also be performed based on only the non-TWAIN mode. Further, although the OS 30 is described as performing exclusive control of the USB port when the scanner driver is started up in the TWAIN mode, an OS that does not have such an exclusive control function may also be employed. In addition, the button monitoring program may be a program that does not record device information in a predetermined file for enabling exclusive control by the OS 30.

Further, although it is described in the above exemplary embodiments that, as illustrated in FIGS. 4 to 6A to 6C, the USB port opened by the button monitoring program is closed when the scanner driver 50 is started in the non-TWAIN mode, the closing timing is not limited to this. The USB port opened by the button monitoring program may be closed after the scanner driver 50 is started and when a read instruction is made via the scanner driver 50 UI screen.

In addition, in the above exemplary embodiments, although it is described that the scanner driver 50 performed the identification of the button monitoring program that is opening the USB port and made the close request to the button monitoring program, the present invention is not limited to this configuration. An application which is started up separately from the scanner driver 50 may determine that an instruction to start the scanner driver to be operated in the non-TWAIN mode is issued, and among the processing illustrated in FIGS. 4 to 6, perform the processing other than reading processing.

Still further, in the above exemplary embodiments, although an example is described in which a USB is used as an interface with the scanner, some other interface may also be used, as long as it requires exclusive control of the communication channel to be performed. This can be either a local interface or a network interface.

Moreover, the scanner and the computer are not limited to being externally connected. A function corresponding to the scanner and a function corresponding to the computer in the above exemplary embodiments may be internally connected and integrated with each other.

Further, the peripheral apparatus is not limited to a scanner. For example, a printer may be used as the peripheral apparatus. In this case, exclusive control of communication channels may be performed when a printer driver performs print image data communication and when a program monitoring events in the printer performs event communication. More specifically, exclusive control may be performed between a device driver which performs image data communication with a peripheral apparatus and another communication program which performs communication with the peripheral apparatus.

According to the above exemplary embodiments, a device driver can use a communication channel by specifying the communication program that is using the communication channel when the device driver is started, and closing the communication channel.

Further, the present invention can also be realized by supplying software (a program) for realizing the functions of the above exemplary embodiments to a system or an apparatus via a network or via various storage media, and having a computer (or a central processing unit (CPU) or a micro processing unit (MPU)) of the system or apparatus read and execute the program. In this case, the program and the recording medium on which the program is recorded constitute the present invention. Further, the program may be executed by one computer, or by a plurality of computers linked together. Furthermore, the above processing does not all have to be realized by software. A part or all of the processing can be realized by hardware.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-102524 filed Apr. 27, 2010, which is hereby incorporated by reference herein in its entirety.

What is claimed is:

1. An information processing apparatus capable of performing exclusive control on a communication channel for communicating with a peripheral apparatus among a plurality of programs, the information processing apparatus comprising:
   a device driver for the peripheral apparatus, configured to communicate with the peripheral apparatus via the communication channel;
   a plurality of communication programs configured to communicate with the peripheral apparatus via the communication channel;
   an identification unit configured to:
   indentify, if the device driver is instructed to start up, in response to the device driver instructed to start up which one of the plurality of communication programs is using the communication channel to be used by the device driver by acquiring a process information that is managed by an operating system (OS); and
   a control unit configured to:
   issue a request to the communication program identified by the identification unit to close the communication channel; and
   open the communication channel to enable the device driver to use the communication channel;
   wherein the identification unit is further configured to:
      acquire the process information managed by the OS if the device driver is instructed to start up based on a request that is not based on a predetermined application program interface (API) and;
      not to acquire the process information managed by the OS if the device driver is instructed to start up based on a request based on the predetermined API.

2. The information processing apparatus according to claim 1, wherein, if there is a plurality of communication programs identified by the identification unit, the control unit issues a close request to one of the plurality of identified communication programs, and if that communication program cannot be closed, issues a close request to another one of the plurality of identified communication programs.

3. The information processing apparatus according to claim 1, wherein, if there is a plurality of communication programs identified by the identification unit, the control unit issues close requests in parallel to each of the plurality of identified communication programs.

4. The information processing apparatus according to claim 1, wherein the predetermined API is a tool without an interesting name (TWAIN).

5. The information processing apparatus according to claim 1, wherein the communication program is a program which monitors an operation in the peripheral apparatus.

6. A method for controlling an information processing apparatus capable of performing exclusive control on a communication channel for communicating with a peripheral apparatus among a device driver for the peripheral apparatus and a plurality of communication programs, the method comprising:
   Identifying which one of the plurality of communication programs is using the communication channel to be used by the device driver, if the device driver is instructed to start up based on a request that is not based on a predetermined application program interface (API);
   acquiring a process information that is managed by an operating system (OS) in response to the device driver is instructed to start up;
   not acquiring the process information managed by the OS if the device driver is instructed to start up based on a request based on the predetermined API; and
   issuing a request to the identified communication program to close the communication channel and;
   opening the communication channel to enable the device driver to use the communication channel.

7. The method according to claim 6, wherein, if there is a plurality of communication programs identified, a close request to one of the plurality of identified communication programs is issued, and if that communication program cannot be closed, a close request to another one of the plurality of identified communication programs is issued.

8. The method according to claim 6, wherein, if there is a plurality of communication programs identified, close requests are issued in parallel to each of the plurality of identified communication programs.

9. The method according to claim 6, wherein the predetermined API is a tool without an interesting name (TWAIN).

10. The method according to claim 6, wherein the communication program is a program which monitors an operation in the peripheral apparatus.

11. A non-transitory computer-readable storage medium storing a program executed by a computer for controlling an information processing apparatus capable of performing exclusive control on a communication channel for communicating with a peripheral apparatus among a device driver for the peripheral apparatus and a plurality of communication programs, the program comprising:
   identifying which one of the plurality of communication programs is using the communication channel to be used by the device driver, if the device driver is instructed to start up based on a request that is not based on a predetermined application program interface (API);
   acquiring a process information that is managed by an operating system (OS) in response to the device driver is instructed to start up;
   not acquiring the process information managed by the OS if the device driver is instructed to start up based on a request based on the predetermined API; and issuing a request to the identified communication program to close the communication channel and;
   opening the communication channel to enable the device driver to use the communication channel.

12. The non-transitory computer-readable storage medium according to claim 11, wherein, if there is a plurality of communication programs identified, a close request to one of the plurality of identified communication programs is issued, and if that communication program cannot be closed, a close request to another one of the plurality of identified communication programs is issued.

13. The non-transitory computer-readable storage medium according to claim 11, wherein, if there is a plurality of communication programs identified, close requests are issued in parallel to each of the plurality of identified communication programs.

14. The non-transitory computer-readable storage medium according to claim 11, wherein the predetermined API is a tool without an interesting name (TWAIN).

15. The non-transitory computer-readable storage medium according to claim 11, wherein the communication program is a program which monitors an operation in the peripheral apparatus.

* * * * *